US011190328B2

(12) United States Patent
Gao et al.

(10) Patent No.: US 11,190,328 B2
(45) Date of Patent: *Nov. 30, 2021

(54) METHODS AND DEVICES FOR REFERENCE SIGNAL CONFIGURATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/633,312

(22) PCT Filed: Jul. 24, 2017

(86) PCT No.: PCT/CN2017/094022
§ 371 (c)(1),
(2) Date: Jan. 23, 2020

(87) PCT Pub. No.: WO2019/018973
PCT Pub. Date: Jan. 31, 2019

(65) Prior Publication Data
US 2020/0162228 A1 May 21, 2020

(51) Int. Cl.
H04L 5/10 (2006.01)
H04L 5/00 (2006.01)
H04W 72/04 (2009.01)

(52) U.S. Cl.
CPC ............. H04L 5/10 (2013.01); H04L 5/0051 (2013.01); H04L 5/0094 (2013.01); H04W 72/0446 (2013.01); H04W 72/0466 (2013.01)

(58) Field of Classification Search
CPC ....... H04L 5/10; H04L 5/0051; H04L 5/0094; H04W 72/0446; H04W 72/0466
See application file for complete search history.

(56) References Cited

U.S. PATENT DOCUMENTS

2014/0233407 A1* 8/2014 Pourahmadi .......... H04L 5/0094
370/252
2016/0020879 A1* 1/2016 Shimezawa ........... H04W 72/04
370/329
(Continued)

FOREIGN PATENT DOCUMENTS

CN 102437986 A 5/2012
CN 104767592 A 7/2015
(Continued)

OTHER PUBLICATIONS

"Discussion on Bursty Interference Measurement Resources", Qualcomm Incorporated, 3GPP TSG RAN WG1 Meeting NR#2, R1-1711246, Jun. 27-30, 2017, pp. 1/6, Qingdao, China.
(Continued)

Primary Examiner — Benjamin H Elliott, IV
(74) Attorney, Agent, or Firm — Sughrue Mion, PLLC

(57) ABSTRACT

Embodiments of the present disclosure relate to methods and devices for reference signal (RS) transmission. In example embodiments, a method implemented in a network device is provided. According to the method, one or more RS patterns are determined for a plurality of RS ports. A RS pattern indicates a configuration of a RS to be transmitted to a terminal device via one or more RS ports. Afterwards, information of the RS patterns is transmitted to the terminal device.

12 Claims, 7 Drawing Sheets

(56) References Cited

U.S. PATENT DOCUMENTS

| | | | |
|---|---|---|---|
| 2018/0041259 A1* | 2/2018 | Kim | H04B 7/0456 |
| 2018/0084593 A1* | 3/2018 | Chen | H04L 5/0048 |
| 2018/0091267 A1* | 3/2018 | Kim | H04L 27/2602 |
| 2018/0131493 A1* | 5/2018 | Luo | H04L 5/0007 |
| 2018/0198648 A1* | 7/2018 | Sun | H04J 11/0073 |
| 2018/0248642 A1* | 8/2018 | Si | H04L 5/0092 |
| 2018/0343653 A1* | 11/2018 | Guo | H04L 5/0053 |
| 2019/0013910 A1* | 1/2019 | Zhang | H04B 7/0452 |
| 2019/0140801 A1* | 5/2019 | Ko | H04L 27/2613 |
| 2019/0173532 A1* | 6/2019 | Liu | H04B 7/04 |
| 2020/0008216 A1* | 1/2020 | Iyer | H04W 72/04 |

FOREIGN PATENT DOCUMENTS

| | | |
|---|---|---|
| CN | 105144612 A | 12/2015 |
| CN | 106470088 A | 3/2017 |
| CN | 106656894 A | 5/2017 |
| EP | 2 830 384 A1 | 1/2015 |
| WO | 2015/158111 A1 | 10/2015 |
| WO | 2017/028673 A1 | 2/2017 |

OTHER PUBLICATIONS

International Search Report for PCT/CN2017/094022 dated Apr. 19, 2018 (PCT/ISA/210).
Written Opinion for PCT/CN2017/094022 dated Apr. 19, 2018 (PCT/ISA/237).
Communication dated Jun. 16, 2020, from the European Patent Office in European Application No. 17919193.7.
Intel Corporation, "On QCL for different BW parts and other QCL details", 3GPP TSG RAN WG1 NR Ad-Hoc#2, R1-1710539, Jun. 27-30, 2017, Qingdao, P.R. China, pp. 1-5 (5 pages total).
Samsung, "On QCL for NR", 3GPP TSG RAN WG1#89, R1-1707979, May 15-19, 2017, Hangzhou, China, pp. 2-8 (8 pages total).
Communication dated Jul. 14, 2020, from the Japanese Patent Office in Application No. 2020-503897.
Communication dated Jul. 28, 2021 from The State Intellectual Property Office of P.R. of China in English Application No. 201780095165.3.

* cited by examiner

METHODS AND DEVICES FOR REFERENCE SIGNAL CONFIGURATION

CROSS REFERENCE TO RELATED APPLICATIONS

This application is a National Stage of International Application No. PCT/CN2017/094022 filed Jul. 24, 2017, the disclosure of which is incorporated herein in its entirety by reference.

TECHNICAL FIELD

Embodiments of the present disclosure generally relate to the field of communications, and in particular, to methods and devices for reference signal (RS) configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

In downlink transmission, a network device (for example, an eNB, a gNB, or a Transmission Reception Point (TRP)) transmits a downlink RS, such as a downlink Demodulation Reference Signal (DMRS), a Channel State Information-Reference Signal (CSI-RS), a downlink Phase Tracking Reference Signal (PTRS), and a fine time/frequency Tracking Reference Signal (TRS), to a terminal device (for example, user equipment (UE)). Upon receipt of the RS, the terminal device may perform quality measurement of the channel between the network device and the terminal device, estimation of the channel, and so on. Generally, the network device transmits a RS configuration to the terminal device prior to the RS transmission, so as to notify the terminal device information of the RS, the allocated resources, and the like.

In uplink transmission, a terminal device (for example, UE) transmits an uplink RS, such as an uplink DMRS, an uplink PTRS, and a SRS, to a network device (for example, an eNB, a gNB, or a TRP). Upon receipt of the RS, the network device may perform quality measurement of the channel between the terminal device and the network device, estimation of the channel, and so on. Generally, the network device transmits a RS configuration to the terminal device prior to the RS transmission, so as to notify the terminal device information of the RS, the allocated resources, and the like.

Conventionally, a sequence of downlink DMRS (also referred to as a "DMRS sequence") is fixed and generated with the same initial value for one Physical Downlink Shared Channel (PDSCH). However, such a fixed DMRS sequence cannot support a plurality of RS ports (or layers) for one PDSCH from one or more TRPs. In addition, a sequence of uplink DMRS is fixed and generated with the same initial value for one Physical Uplink Shared Channel (PUSCH). However, such a fixed DMRS sequence cannot support a plurality of RS ports (or layers) for one PUSCH transmitted to one or more TRPs.

SUMMARY

In general, example embodiments of the present disclosure provide methods and devices for RS configuration.

In a first aspect, there is provided a method implemented in a network device. According to the method, one or more RS patterns are determined for a plurality of RS ports. A RS pattern indicates a configuration of a RS to be transmitted between the network device and a terminal device via one or more RS ports. Afterwards, information of the RS patterns is transmitted to the terminal device.

In a second aspect, there is provided a method implemented in a terminal device. According to the method, the terminal device receives, from a network device, information of one or more RS patterns for a plurality of RS ports. A RS pattern indicates a configuration of a RS to be transmitted between the network device and the terminal device via one or more RS ports.

In a third aspect, there is provided a network device. The network device comprises a processor and a memory coupled to the processor. The memory stores instructions that when executed by the processor, cause the network device to performs actions. The actions comprise: determining one or more RS patterns for a plurality of RS ports, a RS pattern indicating a configuration of a RS to be transmitted between the network device and a terminal device via one or more RS ports; and transmitting information of the RS patterns to the terminal device.

In a fourth aspect, there is provided a terminal device. The terminal device comprises a processor and a memory coupled to the processor. The memory stores instructions that when executed by the processor, cause the terminal device to performs actions. The actions comprise: receiving, from a network device, information of one or more RS patterns for a plurality of RS ports, a RS pattern indicating a configuration of a RS to be transmitted between the network device and the terminal device via one or more RS ports.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
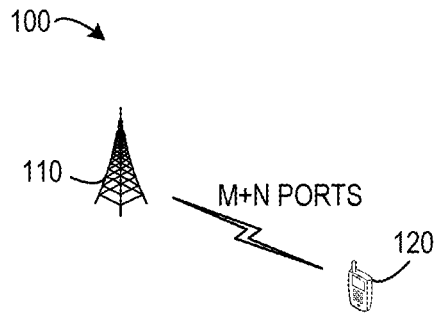
FIGS. 1A and 1B are schematic diagrams 100 and 160 of a communication environment in which embodiments of the present disclosure can be implemented, respectively.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to TRP as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1A shows an example communication network 100 in which embodiments of the present disclosure can be implemented. The network 100 includes a network device 110 and a terminal device 120. The network device 110 transmits a reference signal (for example, a downlink DMRS sequence) to the terminal device 120. For instance, the network device 110 transmits RS(s) via M+N RS ports (referred to as "ports" for short) in one PDSCH. In other words, FIG. 1A shows a scenario of totally M+N layers in one PDSCH from one TRP.

On the other hand, FIG. 1A also shows an uplink transmission in the communication network 100. In particular, the terminal device 120 transmits a reference signal (for example, an uplink DMRS sequence) to the network device 110. For instance, the terminal device 120 transmits RS(s) via M+N RS ports (referred to as "ports" for short) in one PUSCH. In other words, FIG. 1A also shows a scenario of totally M+N layers in one PUSCH transmitted to one TRP.

Figure 1B:
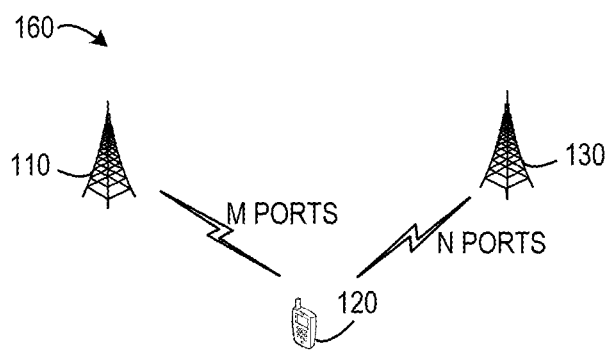

FIG. 1B shows another example communication network 160 in which embodiments of the present disclosure can be implemented. The network 160 includes two network devices 110 and 130, and a terminal device 120. The network devices 110 and 130 transmit reference signals to the terminal device 120, respectively. In particular, the network device 110 transmits DMRS sequence(s) via M RS ports to the terminal device 120, and the network device 110 transmits DMRS sequence(s) via N RS ports to the terminal device 120. Both of the DMRS transmissions are in one PDSCH. In other words, FIG. 1B shows a scenario of totally M+N layers in one PDSCH from 2 TRPs.

On the other hand, FIG. 1B also shows an uplink transmission in the communication network 100. In particular, the terminal device 120 transmits reference signals to the network devices 110 and 130, respectively. In particular, the terminal device 120 transmits DMRS sequence(s) via M RS ports to the network device 110, and the terminal device 120 transmits DMRS sequence(s) via N RS ports to the network device 130. Both of the DMRS transmissions are in one PUSCH. In other words, FIG. 1B also shows a scenario of totally M+N layers in one PUSCH transmitted to 2 TRPs.

It is to be understood that the number of base stations and terminal devices is only for the purpose of illustration without suggesting any limitations. The networks 100 and 160 may include any suitable number of network devices and/or the terminal devices adapted for implementing embodiments of the present disclosure.

Conventionally, different RS ports can only transmit the same DMRS sequence in one PDSCH and/or one PUSCH. In other words, the DMRS sequence is fixed and generated with the same initial value for one PDSCH and/or one PUSCH. However, there is no mechanism to support different DMRS sequences to be transmitted via a plurality of RS ports in one PDSCH and/or one PUSCH.

In order to solve the problems above and one or more of other potential problems, a solution for RS configuration is provided in accordance with example embodiments of the present disclosure. In one embodiment, flexible RS patterns may be provided to a plurality of RS ports (or layers) from one or more TRPs, for example, the RS ports may be transmitted for one PDSCH. In another embodiment, flexible RS patterns may be provided to a plurality of RS ports (or layers) transmitted to one or more TRPs, for example, the RS ports may be transmitted for one PUSCH. In this way, flexibility of RS configuration can be achieved, while no extra signaling overhead is increased.

Principle and implementations of the present disclosure will be described in detail below with reference to FIGS.

Figure 2:
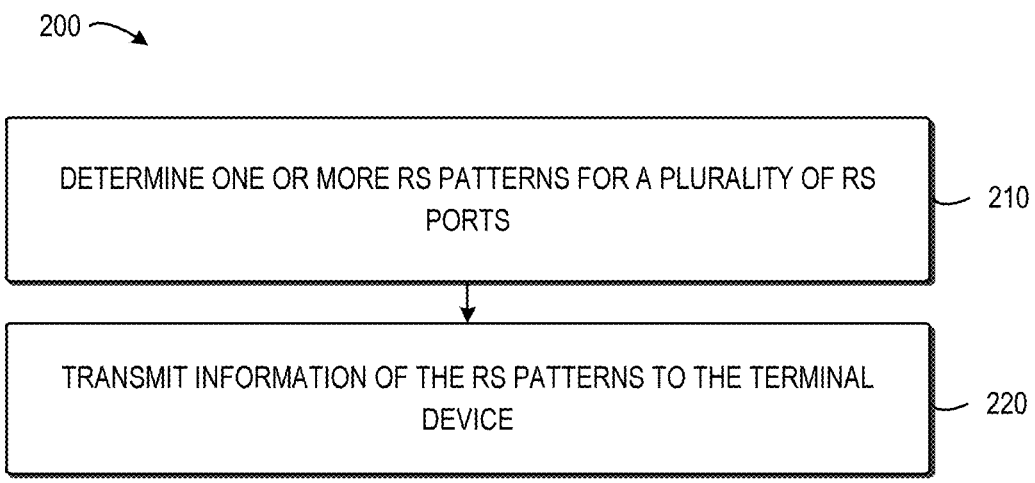
FIG. 2 shows a flowchart of a method 200 for RS configuration in accordance with some embodiments of the present disclosure.

2-8, in which FIG. 2 shows a flowchart of a method 200 for RS configuration in accordance with some embodiments of the present disclosure. With the method 200, the above and other potential deficiencies in the conventional approaches can be overcome. It would be appreciated by those skilled in the art that the method 200 may be implemented by a network device, such as a network device 110 or 130, or other suitable devices.

The method 200 is entered at 210, where one or more RS patterns are determined for a plurality of RS ports. The RS pattern indicates a configuration of a RS to be transmitted between the network device and a terminal device via one or more RS ports. In some embodiments, a RS pattern may indicate a configuration of a RS to be transmitted to a terminal device via one or more RS ports. Alternatively, or in addition, the RS pattern may also indicate a configuration of a RS to be transmitted from a terminal device via one or more RS ports.

According to embodiments of the present disclosure, the RS may include one or more of: a downlink Demodulation Reference Signal (DMRS), an uplink Demodulation Reference Signal (DMRS), a Channel State Information Reference Signal (CSI-RS), a Sounding Reference Signal (SRS), a Phase Tracking Reference Signal (PTRS), Tracking Reference Signal (TRS), and/or the like. For purpose of discussion, some embodiments of the present disclosure are described with reference to DMRS as examples of the RS.

In some embodiments, one or more RS sequences may be transmitted via RS ports, and the RS sequences may be generated from one or several initial values.

In some embodiments, the RS ports may be divided into a plurality of RS port groups. Then, a RS pattern may be determined for each of the plurality of RS port groups. The RS ports may be divided in several ways, for example, system conditions, standards requirements, time/frequency offset, delay spread, frequency spread, and/or the like. In an embodiment, the RS ports may be divided into a plurality of Quasi-Co-Location (QCL) groups. In this case, a RS port group may be a QCL group. In one embodiment, the RS ports within one group may be QCLed. In another embodiment, the RS ports in different groups may be non-QCLed.

In some embodiments, the RS pattern may include factors, such as, an initial value for generating a RS to be transmitted via a RS port or via RS ports in a RS port group, information of the number of symbols used by a RS port or a RS port group, information of resource elements used by a RS port or a RS port group, a multiplexing mode of a RS port or a RS port group, information of RS port group, and so on. Thus, the RS pattern may be determined by determining one or more of the above factors.

As an example, the initial value for generating the RS may be determined based on at least one of: a slot index, a symbol index, an identification of a cell (for example cell ID), and identification of the TRP, an identification of the terminal device, a Radio Network Temporary Identity (RNTI), a cyclic prefix (CP) type, a link type (for example downlink or uplink or sidelink), an index of a RS port group, an index of QCL parameter set, a scrambling identity parameter, a higher layer indicated scrambling identity parameter, an identification of DMRS configuration type, an identification of a bandwidth part, an identification of a carrier component, an identification of subcarrier spacing, and so on.

According to embodiments of the present disclosure, different RS ports or different RS port groups may have independent initial values for RS sequence generation. The sequence (denoted as $R_i$) may be defined with Pseudo-noise (PN) sequence, and the PN sequence generator may be initialized with an initial value, $C_{init}$.

In some embodiments, different RS ports or RS port groups may have independent RS sequences. In one embodiment, for the DMRS ports corresponding to one PDSCH or PUSCH, different DMRS ports or different DMRS port groups may have independent RS sequences and/or independent initial values for RS sequence generation. In one embodiment, for the DMRS ports corresponding to multiple PDSCHs or multiple PUSCHs or multiple PDCCHs for one UE in the same time and/or frequency resources, different DMRS ports or different DMRS port groups may have independent RS sequences and/or independent initial values for RS sequence generation.

In some embodiments, one PTRS port may be associated with one DMRS port in one DMRS ports group. For multiple PTRS ports, the PTRS ports may be associated with different DMRS ports. In one embodiment, the PTRS sequence can be same with that of the associated DMRS port. In another embodiment, for multiple DMRS groups according to one PDSCH or PUSCH, there may be multiple PTRS ports. The PTRS sequence on different PTRS ports may be independent. For example, the PTRS sequence may be generated with independent initial values calculated with at least one of the parameters in QCL parameter set.

In some embodiments, the initial value $C_{init}$ may be calculated with parameter related to at least one of: slots index $n_s$, symbol index l, cell_ID $N^{ID}$, UE_ID $U_{ID}$, RNTI $n_{RNTI}$, CP type $N_{CP}$, link type $N_{link\_type}$, RS port group index $G_i$, QCL parameter set index $Q_i$, scrambling identity parameter-1 $S_{ID}$, scrambling identity parameter-2 $n_{SCID}$, bandwidth part ID $B^{ID}$, carrier component ID $C^{ID}$, subcarrier spacing ID $SC^{ID}$, and so on. In an example, the initial value $C_{init}$ may be obtained by:

$$C_{init} = a_0 \cdot n_s + a_1 \cdot l + a_2 \cdot N^{ID} + a_3 \cdot U^{ID} + a_4 \cdot N_{CP} + a_5 \cdot N_{link_{type}} + \\ a_6 \cdot N_{RNTI} + a_7 \cdot Q_i + a_8 \cdot n_{SCID} + a_9 \cdot G_i + a_{10} \cdot S^{ID} + \\ a_{11} \cdot B^{ID} + a_{12} \cdot C^{ID} + a_{13} \cdot SC^{ID} + b_j \cdot X \cdot Y \quad (1)$$

where $a_i$ is coefficient, i=0, 1, . . . 13, and any of the coefficient can be zero. If $a_i$=0, it means that the corresponding parameter is not included in the calculation of the initial value. In one embodiment, X is one of the parameters, Y is another one of the parameters, $b_j$ is coefficient for the product of the two or more parameters, j is non-negative integer, and any of the coefficient can be zero. If $b_j$=0, it means that the corresponding product of two or more parameters is not included in the calculation of the initial value. In one embodiment there may be no coefficient of $b_j$, that is there is no product of two or more parameters in the calculation of the initial value. In some embodiments, the initial value may be implemented with one or more bits.

In another example, the initial value $C_{init}$ may be obtained by:

$$C_{init} = a_0 \cdot \lfloor n_s K \rfloor + a_1 \cdot l + a_2 \cdot N^{ID} + a_3 \cdot U^{ID} + a_4 \cdot N_{CP} + \\ a_5 \cdot N_{link_{type}} + a_6 \cdot N_{RNTI} + a_7 \cdot Q_i + a_8 \cdot n_{SCID} + a_9 \cdot G_i + \\ a_{10} \cdot S^{ID} + a_{11} \cdot B^{ID} + a_{12} \cdot C^{ID} + a_{13} \cdot SC^{ID} + b_0 \cdot \lfloor n_s / K \rfloor \cdot X + \\ b_j \cdot Y \cdot Z \quad (2)$$

where $a_i$ is coefficient, i=0, 1, . . . 13, and any of the coefficient can be zero. If $a_i$=0, it means that the corresponding parameter is not included in the calculation of the initial value. And K is one of the coefficients for slot index, and K is integer no less than 1. In one embodiment, X is one of the parameters, $b_0$ is coefficient for the product of $\lfloor n_s / K \rfloor$ and another one of the parameters. If $b_0$=0, it means that the corresponding product of $\lfloor n_s / K \rfloor$ and another one or more of the parameters is not included in the calculation of the initial value. Y is one of the parameters, Z is another one of the parameters, $b_j$ is coefficient for the product of the two or more parameters, j is positive integer and no less than 1, and any of the coefficient can be zero. If $b_j=0$, it means that the corresponding product of two or more parameters is not included in the calculation of the initial value. In one embodiment there may be no coefficient of $b_j$, that is there is no product of two or more parameters in the calculation of the initial value. In some embodiments, the initial value may be implemented with one or more bits.

In some embodiments, UE can obtain at least one of the parameters: slots index $n_s$, symbol index l, cell_ID $N^{ID}$, UE_ID $U^{ID}$, RNTI $n_{RNTI}$, CP type $N_{CP}$, link type $N_{link\_type}$, RS port group index $G_i$, QCL parameter set index $Q_i$, scrambling identity parameter-1 $S^{ID}$, scrambling identity parameter-2 $n_{SCID}$, bandwidth part ID $B^{ID}$, carrier component ID $C^{ID}$, subcarrier spacing ID $SC^{ID}$, number of symbols in one slot, carrier frequency range, number of RS ports, number of physical resource blocks and so on. For example, for the parameters, UE can be configured with or UE can detect or UE can infer through other information transmitted from the network device. In some embodiments, at least one of the parameters may have one or more values. In some embodiments, for at least one of the different parameters, and/or different values for at least one of the parameters, the initial value for the RS generation may be different.

In some embodiments, when at least one of the parameters is configured with different values, the number of bits of the initial value for the RS generation may be different. For example, the parameters include at least one of the value of subcarrier spacing, the number of slots in one subframe or in 1 ms or in 10 ms, the number of symbols in one slot, the value of carrier frequency, and the number of synchronization signal (SS) blocks within an SS burst. In one embodiment, the different values of at least one of the parameters may be divided into R subsets. For each subset, at least one of the values may be included. For different subsets, the number of bits of initial value for RS sequence generation may be different. Specifically, for subset $p_i$ where l=1, 2, ... R, the number of bits of initial value may be $d_i$. For example, the values in different subsets may be non-overlapping or partial overlapping. For another example, the number of values in different subsets may be different or same. For still another example, the number of values in each subset is 1, that is, there may be no grouping for the different values.

In some embodiments, when at least one of the parameters is configured with different values, at least one of the coefficients in formula (1) and/or formula (2) may have different values and/or different sets of values and/or different number of values according to the different values for at least one of the configured parameters.

In some embodiments, when at least one of the parameters is configured with different values, at least one of the parameters related to the calculation of the initial value may have different values and/or different sets of values and/or different maximum values and/or different number of values.

In some embodiments, when at least one of the parameters is configured with different values, the parameters related to calculation of initial value may be different. In other words, for example, when at least one of the parameters is configured with one value, then a set of parameters may be related to the calculation of the initial value. When at least one of the parameters is configured with another value, then another set of parameters may be related to the calculation of the initial value. In some embodiments, when at least one of the parameters is configured with some fixed values, at least one of the parameters may be related to the calculation of the initial value. In other words, when at least one of the parameters is configured with other values, at least one of the parameters may not be related to the calculation of the initial value.

In one embodiment, the subcarrier spacing value may be configured with different values, for example the value may be one of {15 kHz, 30 kHz, 60 kHz, 120 kHz, 240 kHz, 480 kHz}. When the subcarrier spacing value is configured with different values, the coefficient(s) for slot index and/or symbol index may have different values. In one example, when the subcarrier spacing value is configured with different values, in formula (1), the coefficient value $a_0$ and/or $a_1$ and/or $b_0$ may have different values. In another example, when the subcarrier spacing value is configured with different values, in formula (2), the coefficient(s) $a_0$ and/or $a_1$ and/or K and/or $b_0$ may have different values. In one example, when subcarrier spacing value is configured with 15 kHz, the value K in formula (2) may be 1 and/or 2 and/or 10 and/or 20. In another example, when subcarrier spacing value is configured with 30 kHz, the value K in formula (2) may be 2 and/or 4 and/or 20 and/or 40. In another example, when subcarrier spacing value is configured with 60 kHz, the value K in formula (2) may be 4 and/or 8 and/or 40 and/or 80. In another example, when subcarrier spacing value is configured with 120 kHz, the value K in formula (2) may be 8 and/or 80. In another example, when subcarrier spacing value is configured with 240 kHz, the value K in formula (2) may be 16 and/or 160. In another example, when subcarrier spacing value is configured with 480 kHz, the value K in formula (2) may be 32 and/or 320.

In one embodiment, the subcarrier spacing value may be configured with different values, for example the value may be one of {15 kHz, 30 kHz, 60 kHz, 120 kHz, 240 kHz, 480 kHz}. When the subcarrier spacing value is configured with different values, the coefficient for CP type may have different values. In one example, when the subcarrier spacing value is configured with different values, in formula (1), the coefficient value $a_4$ and/or $b_j$ may have different values. In another example, when the subcarrier spacing value is configured with different values, in formula (2), the coefficient(s) $a_4$ and/or $b_j$ (j>=1) may have different values.

In another embodiment, the subcarrier spacing value may be configured with a set of values. For example, the set of values may be at least one of {15 kHz, 30 kHz, 60 kHz, 120 kHz, 240 kHz, 480 kHz}. In one embodiment, when the subcarrier spacing value is configured with some of values in the set, the CP type may not be related to the calculation of the initial value. In another embodiment, only when the subcarrier spacing value is configured with some of the values in the set, the CP type may be related to the calculation of the initial value. In one example, when subcarrier spacing value is configured with 60 kHz, the CP type may be related to the calculation of the initial value. In another example, when the subcarrier spacing is configured with other values except 60 kHz, the CP type may not be related to the calculation of the initial value. In another example, when subcarrier spacing value is configured with 60 kHz, the coefficient value of CP type $a_4$ may be non-zero. In another example, when the subcarrier spacing is configured with other values except 60 kHz, the coefficient value of CP type $a_4$ may be zero.

In one embodiment, the number of symbols in one slot may be configured with different values, for example the value may be 7 and/or 14 when subcarrier spacing value is configured with any of {15 kHz, 30 kHz}. The value may be 7 and/or 14 when subcarrier spacing value is configured with 60 kHz and CP type is configured with normal CP. The value may be 6 and/or 12 when subcarrier spacing value is configured with 60 kHz and CP type is configured with extended CP. The value may be 14 when subcarrier spacing value is configured with any of {120 kHz, 240 kHz, 480 kHz}. When the number of symbols in one slot is configured with different values, the coefficient(s) for slot index and/or symbol index may have different values. In one example, when the number of symbols in one slot is configured with different values, in formula (1), the coefficient value $a_0$ and/or $a_1$ and/or $b_j$ may have different values. In another example, when the number of symbols in one slot is configured with different values, in formula (2), the coefficient(s) $a_0$ and/or $a_1$ and/or K and/or $b_0$ may have different values. In one example, when number of symbols in one slot is configured with 7 and subcarrier spacing value is configured with 15 kHz, the value K in formula (2) may be 2 and/or 20. In another example, when number of symbols in one slot is configured with 14 and subcarrier spacing value is configured with 15 kHz, the value K in formula (2) may be 1 and/or 10. In another example, when number of symbols in one slot is configured with 7 and subcarrier spacing value is configured with 30 kHz, the value K in formula (2) may be 4 and/or 40. In another example, when number of symbols in one slot is configured with 14 and subcarrier spacing value is configured with 30 kHz, the value K in formula (2) may be 2 and/or 20. In another example, when number of symbols in one slot is configured with 7 and/or 6 and subcarrier spacing value is configured with 60 kHz, the value K in formula (2) may be 8 and/or 80. In another example, when number of symbols in one slot is configured with 14 and/or 12 and subcarrier spacing value is configured with 60 kHz, the value K in formula (2) may be 4 and/or 40.

In some embodiments, the initial value may be changed within a time duration. In some embodiments, the initial value may be repeated after a time duration. For example, the initial value may be calculated at a timing position, and may have same or different values within a time duration from the timing position. And the initial value repeated after a time duration from the timing position. In some embodiments, the time duration may be based on the subcarrier spacing values and/or number of symbols in one slot. For example, the time duration may be one or several slots based on the subcarrier spacing values and/or number of symbols in one slot. In one embodiment, the time duration may be fixed to L ms. In one embodiment, the time duration may be fixed to be 1 ms, that is a time duration of one subframe.

In one embodiment, the subcarrier spacing value may be configured with different values, for example the value may be one of {15 kHz, 30 kHz, 60 kHz, 120 kHz, 240 kHz, 480 kHz}. When the subcarrier spacing value is configured with different values, the values and/or ranges and/or maximum values for slot index and/or symbol index may be different. In one example, when subcarrier spacing value is configured with 15 kHz, the values for slot index may be at least one of {0} or {0, 1} or {0, 1, . . . 9} or {0, 1, 2, . . . 19}. In another example, when subcarrier spacing value is configured with 15 kHz, the maximum value for slot index may be 0 or 1 or 9 or 19. In another example, when subcarrier spacing value is configured with 15 kHz, the number of values for slot index may be 1 or 2 or 10 or 20. In another example, when subcarrier spacing value is configured with 30 kHz, the values for slot index may be at least one of {0,1} or {0, 1, 2, 3} or {0, 1, 2, 3 . . . 19} or {0, 1, 2, . . . 39}. In another example, when subcarrier spacing value is configured with 30 kHz, the maximum value for slot index may be 1 or 3 or 19 or 39. In another example, when subcarrier spacing value is configured with 30 kHz, the number of values for slot index may be 2 or 4 or 20 or 40. In another example, when subcarrier spacing value is configured with 60 kHz, the values for slot index may be at least one of {0, 1, 2, 3} or {0, 1, 2, 3, 4, 5, 6, 7} or {0, 1, 2, 3 . . . 39} or {0, 1, 2, . . . 79}. In another example, when subcarrier spacing value is configured with 60 kHz, the maximum value for slot index may be 4 or 7 or 39 or 79. In another example, when subcarrier spacing value is configured with 60 kHz, the number of values for slot index may be 4 or 8 or 40 or 80. In another example, when subcarrier spacing value is configured with 120 kHz, the values for slot index may be at least one of {0, 1, 2, 3, 4, 5, 6, 7} or {0, 1, 2, . . . 79}. In another example, when subcarrier spacing value is configured with 120 kHz, the maximum value for slot index may be 7 or 79. In another example, when subcarrier spacing value is configured with 120 kHz, the number of values for slot index may be 8 or 80. In another example, when subcarrier spacing value is configured with 240 kHz, the values for slot index may be at least one of {0, 1, 2, 3, . . . 15} or {0, 1, 2, . . . 159}. In another example, when subcarrier spacing value is configured with 240 kHz, the maximum value for slot index may be 15 or 159. In another example, when subcarrier spacing value is configured with 240 kHz, the number of values for slot index may be 16 or 160. In another example, when subcarrier spacing value is configured with 480 kHz, the values for slot index may be at least one of {0, 1, 2, 3, . . . 31} or {0, 1, 2, . . . 319}. In another example, when subcarrier spacing value is configured with 480 kHz, the maximum value for slot index may be 31 or 319. In another example, when subcarrier spacing value is configured with 480 kHz, the number of values for slot index may be 32 or 320.

In one example, when subcarrier spacing value is configured with 15 kHz, there may be at least one set of {0, 1, . . . 6} or {0, 1, 2, . . . 13}, and the values for symbol index may be at least one of the values for each set. In another example, when subcarrier spacing value is configured with 30 kHz, there may be at least one set of {0, 1, . . . 6} or {0, 1, 2, . . . 13}, and the values for symbol index may be at least one of the values for each set. In another example, when subcarrier spacing value is configured with 60 kHz, there may be at least one set of {0, 1, . . . 6} or {0, 1, 2, . . . 13} or {0, 1, . . . 5} or {0, 1, . . . 11}, and the values for symbol index may be at least one of the values for each set. In another example, when subcarrier spacing value is configured with 120 kHz or 240 kHz or 480 kHz, the values for symbol index may be at least one of {0, 1, . . . 13}.

In one embodiment, the subcarrier spacing value may be configured with different values, for example the value may be one of {15 kHz, 30 kHz, 60 kHz, 120 kHz, 240 kHz, 480 kHz}. When the subcarrier spacing value is configured with different values, the CP type $N_{CP}$ may have different values and/or different number of values. In one example, when subcarrier spacing value is configured with 15 kHz or 30 kHz or 120 kHz or 240 kHz or 480 kHz, the CP type $N_{CP}$ may fixed to zero. Or the number of values for CP type is 1. In another example, when subcarrier spacing value is configured with 60 kHz, the CP type $N_{CP}$ may 0 or 1. Or the number of values for CP type is 2. For example, when the cyclic prefix is configured with normal CP, the CP type parameter $N_{CP}$ may be 0. For example, when the cyclic prefix is configured with extended CP, the CP type parameter $N_{CP}$ may be 1.

In one embodiment, the number of symbols in one slot may be configured with different values, for example the value may be 7 and/or 14 when subcarrier spacing value is configured with any of {15 kHz, 30 kHz}. The value may be 7 and/or 14 when subcarrier spacing value is configured with 60 kHz and CP type is configured with normal CP. The value may be 6 and/or 12 when subcarrier spacing value is configured with 60 kHz and CP type is configured with extended CP. The value may be 14 when subcarrier spacing value is configured with any of {120 kHz, 240 kHz, 480 kHz}. When the number of symbols in one slot is configured with different values, the symbol index may have different values.

In some embodiments, for different DMRS ports or DMRS port groups or QCL parameters set, the DMRS sequence and/or initial value for DMRS sequence generation may be independently configured. Specifically, the DMRS sequence and/or initial value for DMRS sequence generation may be associated to the value of Cell ID of different TRPs/cells. By way of example, for the DMRS ports or DMRS port group QCLed to the RS from TRP1, the DMRS sequence and/or initial value for DMRS sequence generation may be associated to the cell ID of TRP1. For the DMRS ports or DMRS port group QCLed to the RS from TRP2, DMRS sequence and/or initial value for DMRS sequence generation may be associated to the cell ID of TRP2.

In some embodiments, the scrambling identity parameter $S^{ID}$ may be one of the parameters related to the calculation of initial value $C_{init}$. The value of parameter $S^{ID}$ may be independently configured for different DMRS ports or DMRS port groups or QCL parameters set. For example, if no value if provided by higher layers, then the value may be fixed for one cell or TRP. For example, the value is same with cell ID. For another example, the value of parameter $S^{ID}$ may be provided in the QCL parameters. For different QCL parameters sets, the value of parameter $S^{ID}$ may be same or different. In one embodiment, for different DMRS ports or different DMRS port groups or different QCL parameters, the value $S^{ID}$ is independently configured. Specifically, the value $S^{ID}$ may be associated to the value of Cell ID of different TRPs/cells. By way of example, for the DMRS ports or DMRS port group QCLed to the RS from TRP1, the value $S^{ID}$ may be the cell_ID of TRP1. For the DMRS ports or DMRS port group QCLed to the RS from TRP2, the value $S^{ID}$ may be the cell ID of TRP2.

In one embodiment, the carrier frequency range and/or number of RS ports may be configured with different values. When the carrier frequency range and/or number of RS ports is configured with different values, the coefficient(s) for scrambling ID and/or the values for scrambling ID and/or the number of values for scrambling ID for the initial value of RS sequence generation may have different values. In one example, when the carrier frequency range and/or number of RS ports is configured with different values, in formula (1), the coefficient value $a_8$ and/or $a_{10}$ and/or $b_j$ may have different values. In another example, when the carrier frequency range and/or number of RS ports is configured with different values, in formula (2), the coefficient(s) $a_8$ and/or $a_{10}$ and/or $b_j$ may have different values. In one example, when the carrier frequency range and/or number of RS ports is configured with different values, in formula (1) and/or formula (2), the number of values and/or the values of $n_{SCID}$ and/or $S^{ID}$ may be different.

In some alternative embodiments, the initial value $C_{init}$ may be calculated by:

$$c_{init}=(\lfloor n_s/2 \rfloor+1)(2n_{ID}^{(nSCID,i)}+1)2^{16}+n_{SCID} \quad (3)$$

where i may be the index of DMRS ports group or QCL parameters set.

The quantities $n_{ID}^{(nSCID,i)}$ may be given by QCL parameters or DMRS port groups. If no value is provided by higher layers $n_{ID}^{(nSCID,i)}=n_{ID}^{cell}$, which is the cell ID of the TRP or cell. Otherwise, $n_{ID}^{(nSCID,i)}=n_{ID}^{DMRS,i}$, which is provided in the QCL parameters.

For different DMRS groups or different QCL parameters, the value $n_{ID}^{DMRS,i}$ is independently configured. Specifically, the value $n_{ID}^{DMRS,i}$ may be associated to the value of Cell ID of different TRPs/cells. By way of example, for the DMRS group QCLed to the RS from TRP1, the value $n_{ID}^{DMRS,i}$ may be the cell ID of TRP1. For the DMRS group QCLed to the RS from TRP2, the value $n_{ID}^{DMRS,i}$ may be the cell ID of TRP2.

In some embodiments, the DMRS sequence and/or initial value for sequence generation of DMRS for PDCCH may be independently or differently configured for different TRPs and/or different cells and/or different beams and/or different UEs and/or different UE groups.

In some embodiments, at least one of symbol index l, RNTI $n_{RNTI}$, scrambling identity $n_{ID}$ may be related to the initial value $C_{init}$ for the generation of DMRS for PDCCH. In one embodiment, for different PDCCHs, for example from different TRPs and/or cells and/or beams and/or different UEs and/or different UE groups, the value of symbol index l and/or the value of RNTI $n_{RNTI}$ and/or value of scrambling identity $n_{ID}$ may be different. In another embodiment, for different PDCCHs, for example from different TRPs and/or cells and/or beams and/or different UEs and/or different UE groups, the number of values of symbol index l and/or the number of values of RNTI $n_{RNTI}$ and/or number of values of scrambling identity $n_{ID}$ may be different. In another embodiment, for different PDCCHs, for example from different TRPs and/or cells and/or beams and/or different UEs and/or different UE groups, the value of coefficient of symbol index l and/or the value of coefficient of RNTI $n_{RNTI}$ and/or value of coefficient of scrambling identity $n_{ID}$ may be different. For example, UE may be configured to decode multiple PDCCHs from multiple TRPs.

In some embodiments, when the carrier frequency range and/or bandwidth and/or number of physical resource blocks is configured with different values. At least one of value of symbol index l, value of RNTI $n_{RNTI}$, value of scrambling identity $n_{ID}$, number of values of symbol index l, number of values of RNTI $n_{RNTI}$, number of values of scrambling identity $n_{ID}$, value of coefficient of symbol index l, value of coefficient of RNTI value of coefficient of scrambling identity $n_{ID}$ may be different. In one example, when the number of physical resource blocks is larger than X, the number of symbol index l is 2. In another example, when the number of physical resource blocks is smaller than X, the number of symbol index l is 3. In one example, when the number of physical resource blocks is larger than X, the value of symbol index l is at least one of {0, 1}. In another example, when the number of physical resource blocks is smaller than X, the value of symbol index l is at least one of {0, 1, 2}. In one example, when the carrier frequency range is up to 3 GHz, the number of $n_{ID}$ is less than 4 or equals to 4. In another example, when the carrier frequency range is from 3 GHz to 6 GHz, the number of $n_{ID}$ is less than 8 or equals to 8. In another example, when the carrier frequency range is from 6 GHz to 52.6 GHz, the number of $n_{ID}$ is less than 64 or equals to 64.

As a further alternative, in some embodiments, the initial value $C_{init}$ may be calculated by:

$$c_{init}=(\lfloor n_s/2 \rfloor+1)*(2N_{ID}^{cell}+1)*2^{16}+n_{RNTI}*2^i+n_{ID} \quad (4)$$

For multiple PDCCHs from multiple TRPs, UE may blindly decode PDCCH with different DMRS sequences, where each sequence is generated with initial value according to different TRPs. For example, for different cells, $n_{RNTI}$ is different.

For different beams or different multi-users in one TRP, different $n_{ID}$ may be used. For example, for a broadcast or multi-cast PDCCH, the $n_{ID}$ may be assumed to be zero. In another example, for one UE, the supported number of different PDCCH DMRS sequence in one TRP equals to or less than $2^i$.

According to embodiments of the present disclosure, different sequences may be generated for different RS ports and/or RS ports groups, e.g. for one UE and/or for one PDSCH. For different RS ports, the sequence may be generated with different initial values. For example, for RS port i, the sequence may be generated with an initial value, $C_{init\_i}$.

In some embodiments, the RS ports configured for one UE may be divided into groups. For different RS port groups, different sequences may be generated with different initial values. By way of example, for RS ports group j, the sequence is generated with an initial value, $C_{init\_j}$.

In some embodiments, the sequence may be generated with the same initial value in one RS port group. For instance, for the RS ports in a RS port group with frequency domain and/or time domain CDM, the sequence should be generated with the same initial value for the RS port group.

In some embodiments, the sequence may be generated with same initial value for the adjacent REs in time and/or frequency domain for RS transmission. In some embodiments, the sequence may be generated with same initial value for the adjacent symbols for RS transmission. In some embodiments, the sequence may be generated with same initial value for the REs used for CDM in time and/or frequency domain, in other words, the sequence values may be same on the REs used for CDM in time and/or frequency domain.

In some embodiments, in the determination of the RS patterns, if a first RS port and a second port are mapped in the same symbol and multiplexed with Code Division Multiplexing (CDM) in frequency domain, it can be determined that the first and second RS ports use the same RS base sequence. For example, the RS ports multiplexed with CDM in frequency domain may be achieved with that the RS ports are configured with different cyclic shift values based on one same base sequence. For another example, the RS ports multiplexed with CDM in frequency domain may be achieved with that the RS ports are configured with different orthogonal cover code values in the 2 REs in frequency domain, for example {1, 1} and {1, −1}.

Alternatively, or in addition, in some embodiments, if a first RS port and a second port are mapped in the same resource elements and multiplexed with the CDM in the frequency domain, it can be determined that the first and second RS ports use the same RS base sequence.

Figure 3A:
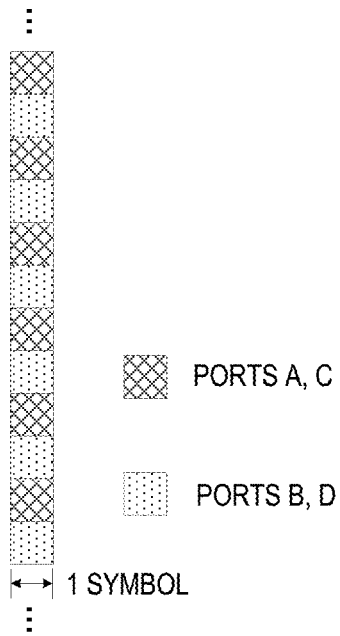
FIGS. 3A-3F show schematic diagrams of RS patterns according to embodiments of the present disclosure, respectively.

Now more examples will be discussed with respect to FIGS. 3A-3F. FIGS. 3A-3F show schematic diagrams of RS patterns according to embodiments of the present disclosure, respectively. As shown in FIG. 3A, ports A and C are mapped in the same symbol, and multiplexed with CDM in frequency domain, e.g. cyclic shift (port A and C are configured with different cyclic shift values). In this example, ports B and D are mapped in the same symbol, and multiplexed with CDM in frequency domain, e.g. cyclic shift (port B and D are configured with different cyclic shift values). Port A and/or port C are multiplexed with FDM with port B and/or port D. For example, port A and/or port C are configured with different comb offset values from port B and/or port D (e.g. Interleaved frequency division multiplexing access (IFDMA)).

In embodiments described with reference to FIG. 3B, ports A and C are mapped in the 2 symbols, and multiplexed with CDM in frequency domain, e.g. cyclic shift (port A and C are configured with different cyclic shift values). Ports B and D are mapped in the 2 symbols, and multiplexed with CDM in frequency domain, e.g. cyclic shift (port B and D are configured with different cyclic shift values). Ports E and G are mapped in the 2 symbols, and multiplexed with CDM in frequency domain, e.g. cyclic shift (port E and G are configured with different cyclic shift values). Ports F and H are mapped in the 2 symbols, and multiplexed with CDM in frequency domain, e.g. cyclic shift (port F and H are configured with different cyclic shift values).

Figure 3B:
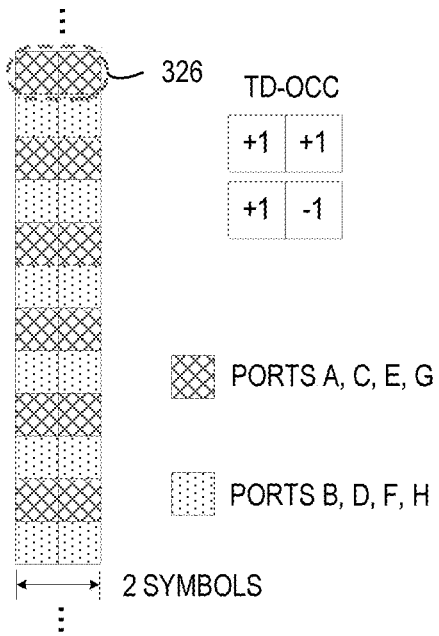

In the example of FIG. 3B, port A and/or port C are multiplexed with CDM in time domain (e.g. TD-OCC) with port E and/or port G. For instance, port A and/or port C are configured with different OCC values from port E and/or port G in time domain, e.g. port A and/or port C are configured with OCC {1, 1} in the 2 adjacent resource elements (REs). In the embodiments shown with respect to FIG. 3B, where the 2 REs are in same frequency location and in 2 different symbols, port E and/or port G are configured with OCC {1, −1} in the 2 adjacent REs.

In addition, port B and/or port D may be multiplexed with CDM in time domain (e.g. TD-OCC) with port F and/or port H. Port B and/or port D may be configured with different OCC values from port F and/or port H. For example, port B and/or port D are configured with OCC {1, 1} in the 2 adjacent REs in time domain, and port F and/or port H are configured with OCC {1, −1} in the 2 adjacent REs in time domain.

Port A and/or C and/or E and/or G may be multiplexed with port B and/or D and/or F and/or H with FDM manner. By way of example, port A and/or C and/or E and/or G are configured with different resources in frequency domain from those of with port B and/or D and/or F and/or H. For instance, port A and/or C and/or E and/or G are configured with different comb offset values from those of with port B and/or D and/or F and/or H.

In embodiments described with reference to FIG. 3C, ports A and B are mapped in the same symbol, and multiplexed with CDM in frequency domain, e.g. FD-OCC (e.g. port A is configured with OCC {1, 1} in the 2 adjacent REs in frequency domain, where the 2 REs are in same symbol and 2 different frequency resource elements, and port B may be configured with OCC {1, −1} in 2 adjacent REs in frequency domain.

Ports C and D are mapped in the same symbol, and multiplexed with CDM in frequency domain, e.g. FD-OCC.

Ports E and F are mapped in the same symbol, and multiplexed with CDM in frequency domain, e.g. FD-OCC.

Port A and/or port B are multiplexed with FDM with port C and/or port D. For example, port A and/or port B are configured with resources in frequency domain from port C and/or port D.

Port A and/or port B are multiplexed with FDM with port E and/or port F. For example, port A and/or port B are configured with resources in frequency domain from port E and/or port F.

Port C and/or port D are multiplexed with FDM with port E and/or port F. For example, port C and/or port D are configured with resources in frequency domain from port E and/or port F.

Figure 3C:
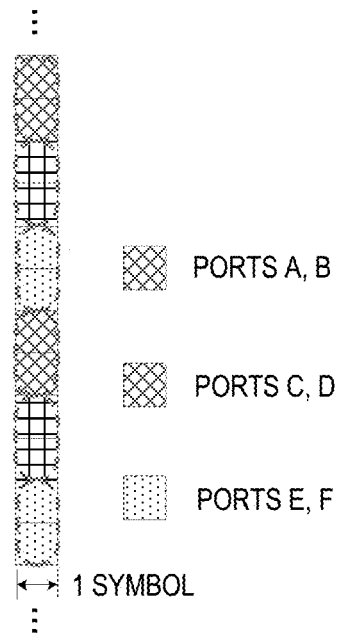
Figure 3D:
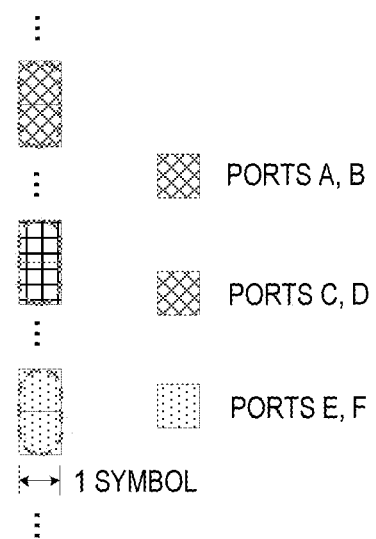

It is to be understood that the embodiments show with respect to FIG. 3C are for purpose of illustration, rather than limitation. Those skilled in the art would appreciate that the resources for port A and/or B and the resources for port C and/or D and the resources for port E and/or F may be adjacent and/or non-adjacent. Embodiments described with reference to FIG. 3D illustrate another example for DMRS configuration with 1 symbol. In the example of FIG. 3D, the resources for ports A, B, ports C, D and ports E, F are non-adjacent.

Figure 3E:
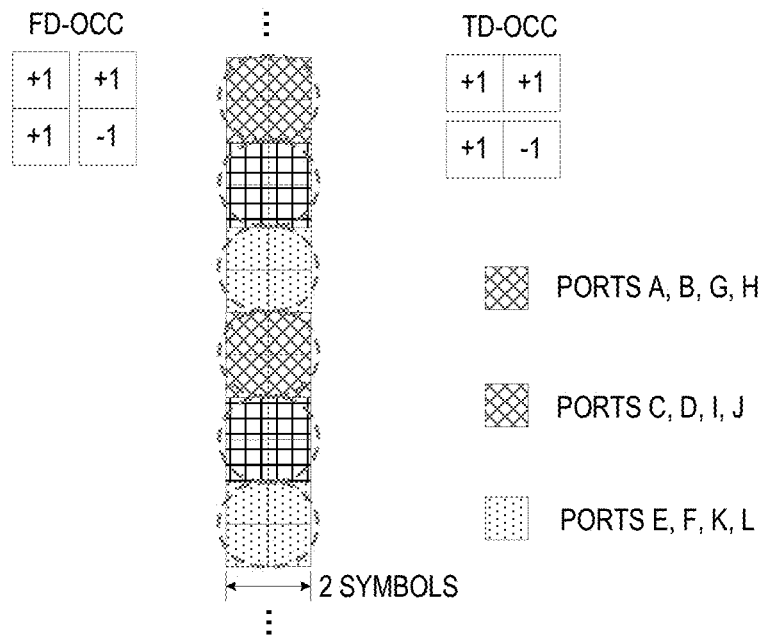

In embodiments described with reference to FIG. 3E, ports A, B are mapped in the same symbol, and multiplexed with CDM in frequency domain, e.g. FD-OCC. By way of example, port A is configured with OCC {1, 1} in the 2 adjacent REs in frequency domain, where the 2 REs are in same symbol and 2 different frequency resource elements, and port B may be configured with OCC {1, −1} in 2 adjacent REs in frequency domain.

Ports C and D are mapped in the same symbol, and multiplexed with CDM in frequency domain, e.g. FD-OCC.

Ports E and F are mapped in the same symbol, and multiplexed with CDM in frequency domain, e.g. FD-OCC.

Port A and/or port B and port G and/or H are multiplexed with CDM in time domain, e.g. TD-OCC. For example, port A and/or B may be configured with OCC {1, 1} in time domain, port G and/or H may be configured with OCC {1, −1} in time domain.

Port C and/or port D and port I and/or J are multiplexed with CDM in time domain, e.g. TD-OCC. For example, port C and/or D may be configured with OCC {1, 1} in time domain, port I and/or J may be configured with OCC {1, −1} in time domain.

Port E and/or port F and port K and/or L are multiplexed with CDM in time domain, e.g. TD-OCC. For example, port E and/or F may be configured with OCC {1, 1} in time domain, port K and/or L may be configured with OCC {1, −1} in time domain.

Port A and/or port B and/or port G and/or port H are multiplexed with FDM with port C and/or port D and/or port I and/or port J. For example, port A and/or port B and/or port G and/or port H are configured with resources in frequency domain from port C and/or port D and/or port I and/or port J.

Port C and/or port D and/or port I and/or port J are multiplexed with FDM with port E and/or port F and/or port K and/or port L. For example, Port C and/or port D and/or port I and/or port J are configured with resources in frequency domain from port E and/or port F and/or port K and/or port L.

Port A and/or port B and/or port G and/or port H are multiplexed with FDM with port E and/or port F and/or port K and/or port L. For example, port A and/or port B and/or port G and/or port H are configured with resources in frequency domain from port E and/or port F and/or port K and/or port L.

Figure 3F:
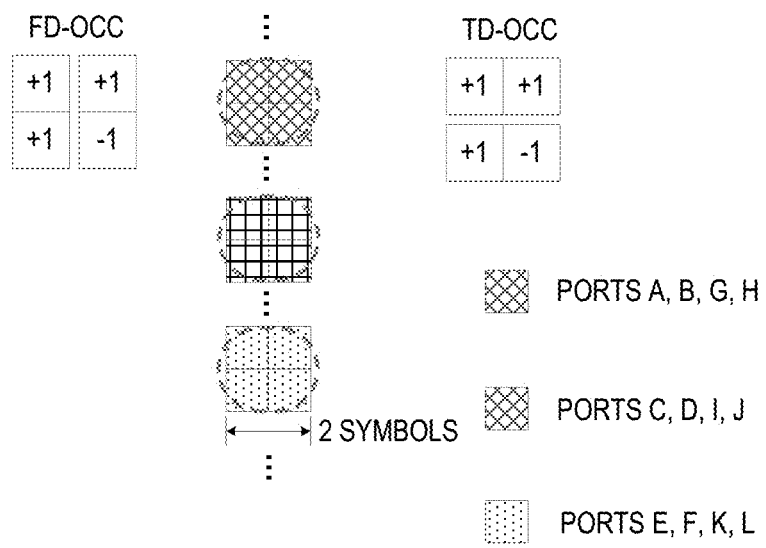

In the example of FIG. 3F, the resources for ports A, B, G, H, ports C, D, I, J, and ports E, F, K, L are non-adjacent.

At 220, information of the RS patterns is transmitted to the terminal device. In some embodiments, the information of the RS patterns may be transmitted via a high level signaling, for example, a Radio Resource Control (RRC) signaling, a Media Access Control (MAC) layer, and so on. Alternatively or in addition, the information of the RS patterns may be transmitted via a dynamic signaling, such as Downlink Control Information (DCI), or other suitable signaling transmitted on the downlink channel.

In some embodiments, the network device may include the information of the RS patterns in a QCL parameter set, and transmit the QCL parameter set to the terminal device. More details of the indication of the RS patterns will be discussed below with reference to FIGS. 4A-4E.

Figure 4A:
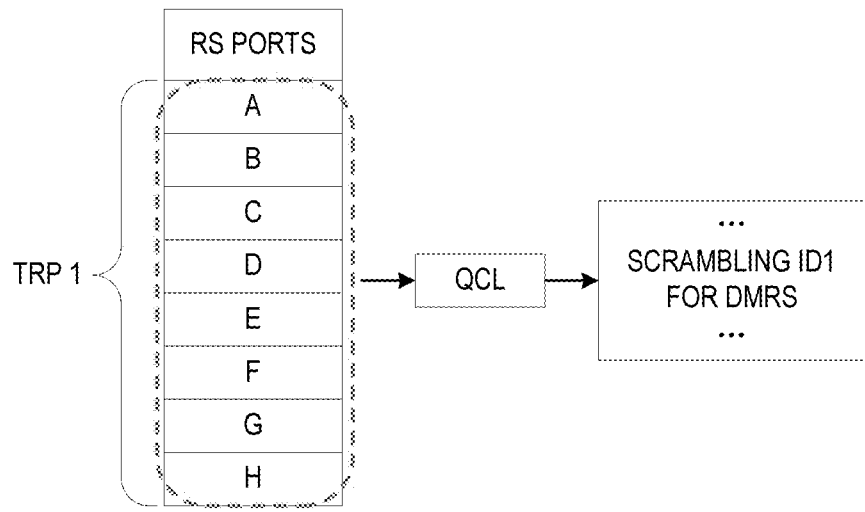
FIGS. 4A-4E show schematic diagrams of indications of RS patterns according to embodiments of the present disclosure, respectively.

FIGS. 4A-4E show schematic diagrams of indications of RS patterns according to embodiments of the present disclosure, respectively, in which a PDSCH with 8 ports is taken for example. In the example of FIG. 4A, there are 8 ports from one TRP, namely, TRP 1, these 8 ports may be QCLed with QCL parameter set 1. The QCL parameter set 1 includes scrambling ID1 for DMRS, and one sequence may be generated with the initial value.

Figure 4B:
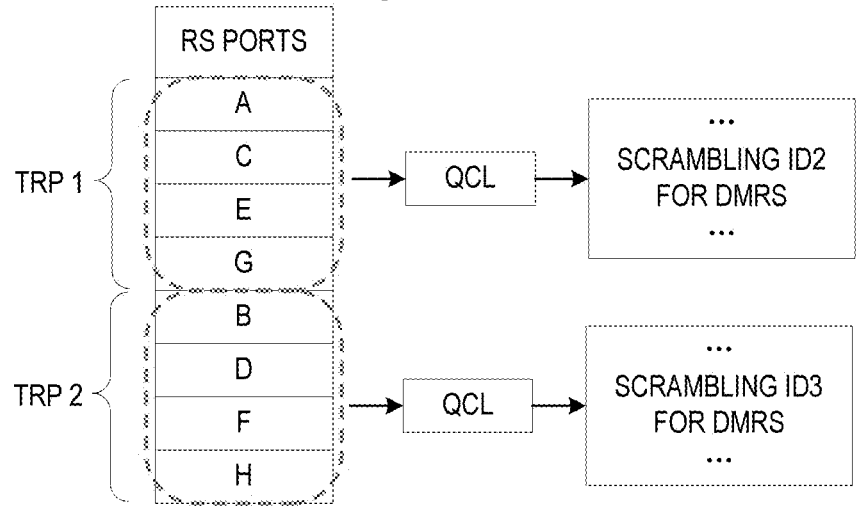

In the example of FIG. 4B, the first 4 ports (ports A, C, E, G) belong to the TPR 1 and are QCLed with QCL parameter set 2. Another 4 ports (ports B, D, F, H) belong to another TRP 2 and are QCLed with QCL parameter set 3. The QCL parameter sets 2 and 3 include scrambling ID2 and ID3 for DMRS, respectively, and sequences can be generated with independent initial values.

Figure 4C:
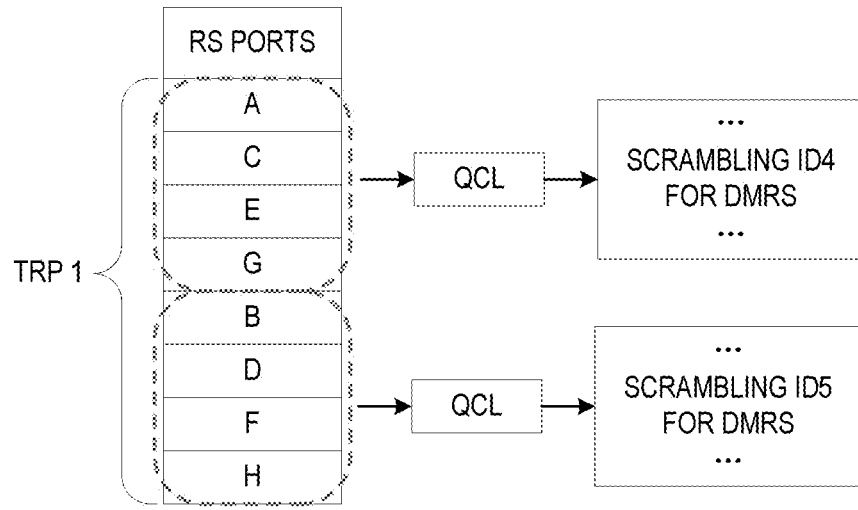

FIG. 4C shows 8 ports from one TRP, namely, the TRP 1. Among the 8 ports, the first 4 ports (ports A, C, E, G) belong to one DMRS port group and are QCLed with one RS. The other 4 ports (ports B, D, F, H) belong to another DMRS port group and are QCLed with another RS. The QCL parameter sets 4 and 5 include scrambling ID4 and ID5 for DMRS, respectively.

In some embodiments, the scrambling ID is same for same TRP. Thus, the scrambling ID4 equals to the scrambling ID5 in the example shown with respect to FIG. 4C. If DMRSs are from the same TRP 1 in embodiments shown with respect to FIGS. 4A-4C, the scrambling ID1=the scrambling ID2=the scrambling ID4=the scrambling ID5.

In some embodiments, UE can be configured with a set of RS ports, and the number of RS ports is N, for example the port index is $(P_1, P_2, P_3, \ldots P_N)$ where N is integer and $1 \Leftarrow N \Leftarrow 12$. For example, N may be at least one of $\{1, 4, 6, 8, 12\}$. In some embodiments, subsets of RS ports may be selected from the set of N RS ports, and each subset of RS ports may be one RS group, and the RS ports within the group may be QCLed. In some embodiments, there may be Q groups of RS ports, where is Q integer and Q>=1, and the number of RS ports in each group may be $M_q$, where $M_q$ is integer and $1 \Leftarrow M_q \Leftarrow N$, and q is integer and $1 \Leftarrow q \Leftarrow Q$. For each group, the number of RS ports may be independent, that is the number of RS ports in each group may be same or different. For each group, the RS port indices may be independent, that is the RS port indices in each group may be overlapped or non-overlapped or partial overlapped. For example, the number of RS ports and the RS port indices in two groups may be same, and at least one of the QCL parameters corresponding to the two RS port groups may be different.

In some embodiments, some RS ports may always be in one QCL group. In some embodiments, the RS ports multiplexed with CDM in frequency domain and/or CDM in time domain should be in one QCL group. In one example, taking FIG. 3A for example, the RS ports A and C are multiplexed with CDM in frequency domain, these two ports should be in one QCL group, the RS ports B and D are multiplexed with CDM in frequency domain, these two ports should be in one QCL group. In another example, taking FIG. 3B for example, the RS ports A and C are multiplexed with CDM in frequency domain, these two ports should be in one QCL group. The RS ports B and D are multiplexed with CDM in frequency domain, these two ports should be in one QCL group. The RS ports E and G are multiplexed with CDM in frequency domain, these two ports should be in one QCL group. The RS ports F and H are multiplexed with CDM in frequency domain, these two ports should be in one QCL group. In another example, taking FIG. 3B for example, the RS ports A and C are multiplexed with CDM in frequency domain, and ports E and G are multiplexed with CDM in frequency domain, and port A and/or C may be multiplexed with port E and/or G with CDM in time domain, these four ports may be in one QCL group. The RS ports B and D are multiplexed with CDM in frequency domain, and the RS ports F and H are multiplexed with CDM in frequency domain, and the port B and/or D may be multiplexed with port F and/or H with CDM in time domain, these four ports may be in one QCL group. In another example, taking FIG. 3C for example, the ports A and B may be in one QCL group, the ports C and D may be in one QCL group, the ports E and F may be in one QCL group. In another example, taking FIG. 3E for example, the ports A and B may be in one QCL group, the ports C and D may be in one QCL group, the ports E and F may be in one QCL group, the ports G and H may be in one QCL group, the ports I and J may be in one QCL group, the ports K and L may be in one QCL group. In another example, taking FIG. 3E for example, the ports A, B, G, H may be in one QCL group, the ports C, D, I, J may be in one QCL group, the ports E, F, K, L may be in one QCL group.

Figure 4D:
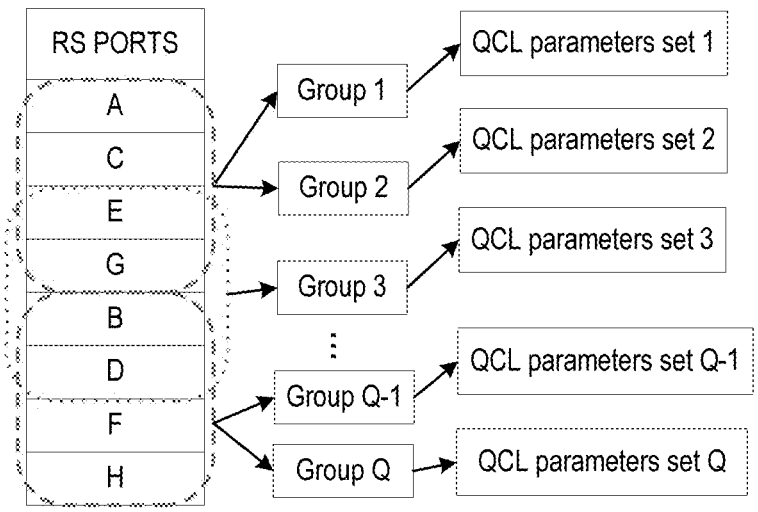

FIG. 4D show schematic diagrams of indications of RS patterns according to embodiments of the present disclosure, respectively, in which a PDSCH with 8 ports is taken for example. In the example of FIG. 4D, there are 8 ports DMRS, at least one ports from these 8 ports may be grouped in one group, for example Group q, and the RS ports in this group QCLed with one QCL parameter set, for example QCL parameters set q. In one embodiment, the RS sequence for the RS ports in one group may be generated with the initial value related to at least one of the parameters in the QCL parameters set q.

Figure 4E:
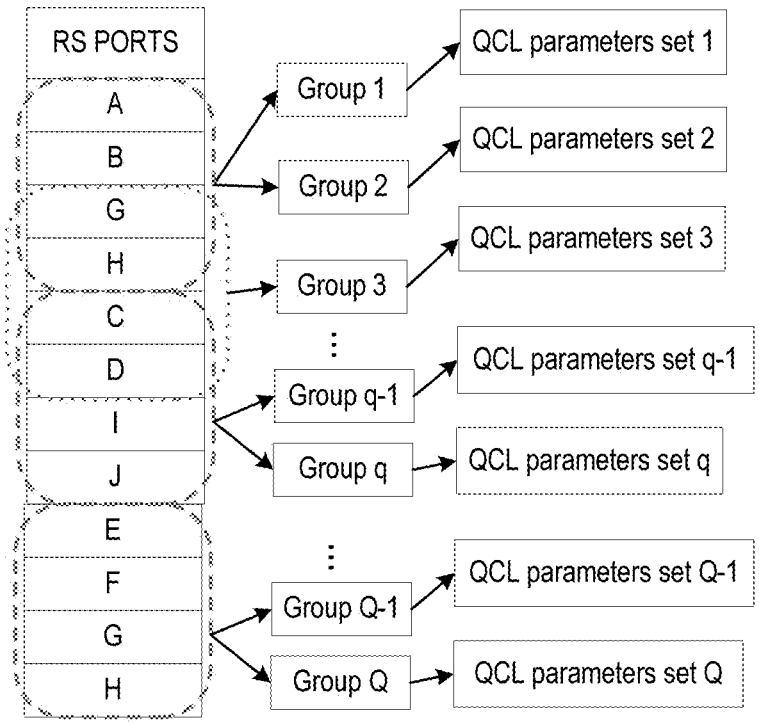

FIG. 4E shows schematic diagrams of indications of RS patterns according to embodiments of the present disclosure, respectively, in which a PDSCH with 12 ports is taken for example. In the example of FIG. 4E, there are 12 ports DMRS, at least one ports from these 12 ports may be grouped in one group, for example Group q, and the RS ports in this group QCLed with one QCL parameter set, for example QCL parameters set q. In one embodiment, the RS sequence for the RS ports in one group may be generated with the initial value related to at least one of the parameters in the QCL parameters set q.

Figure 5:
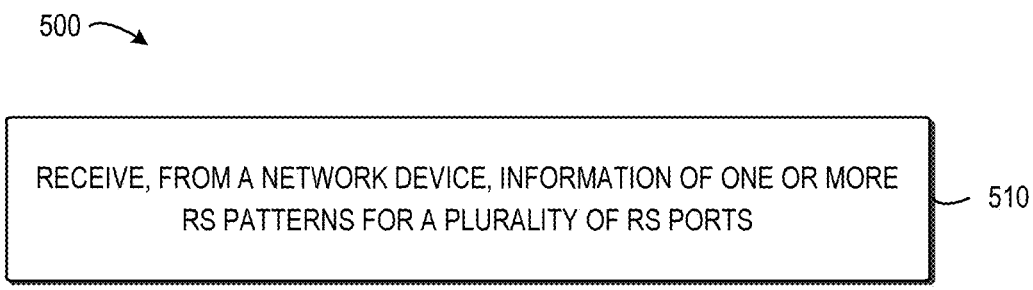
FIG. 5 shows a flowchart of a method 500 for RS configuration in accordance with some embodiments of the present disclosure.

Now reference is made to FIG. 5, which shows a flowchart of a method 500 for RS configuration in accordance with some embodiments of the present disclosure. It would be appreciated that the method 500 may be implemented at a terminal device, for example, the terminal device 120, or any other suitable device.

The method 500 is entered at 510, where the terminal device 120 receives, from a network device, information of one or more RS patterns for a plurality of RS ports. The RS pattern indicates a configuration of a RS to be transmitted between the network device and the terminal device via one or more RS ports. In some embodiments, a RS pattern may indicate a configuration of a RS to be transmitted to a terminal device via one or more RS ports. Alternatively, or in addition, the RS pattern may also indicate a configuration of a RS to be transmitted from a terminal device via one or more RS ports. The RS patterns may be determined based on the method 200 as discussed above.

In some embodiments, the terminal device receives a RS via a RS port. The RS may be for example, a DMRS sequence. Then, the terminal device may demodulate the RS based on the RS patterns.

Figure 6:
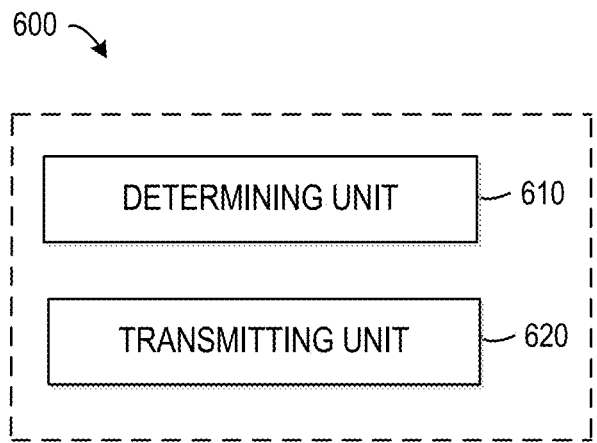
FIG. 6 shows a block diagram of a network device 600 in accordance with some embodiments of the present disclosure.

Now reference is made to FIG. 6, which shows a block diagram of an apparatus 600 in accordance with an embodiment of the present disclosure. It would be appreciated that the apparatus 600 may be implemented at a network device, for example, the network device 110 or 130, or any other suitable device.

As shown, the apparatus 600 includes a determining unit 610 and a transmitting unit 620. The determining unit 610 is configured to: determine one or more reference signal (RS) patterns for a plurality of RS ports, a RS pattern indicating a configuration of a RS to be transmitted to a terminal device via one or more RS ports. The second transmitting unit 620 is configured to: transmit information of the RS patterns to the terminal device.

In an embodiment, the determining unit 610 may be configured to divide the RS ports into a plurality of RS port groups, and determine a RS pattern for each of the plurality of RS port groups.

In an embodiment, a RS port group is a QCL group.

In an embodiment, the determining unit 610 may be configured to determine at least one of: an initial value for generating a RS to be transmitted via a RS port or via RS ports in a RS port group; information of a symbol used by a RS port or a RS port group; information of a resource element used by a RS port or a RS port group; a multiplexing mode of a RS port or a RS port group; and information of RS port groups.

In an embodiment, the determining unit 610 may be configured to: determine the initial value based on at least one of: a slot index, a symbol index, an identification of a cell, an identification of the network device, an identification of the terminal device, a RNTI, a CP type, a link type, an index of a RS port group, an index of QCL parameter set, a scrambling identity parameter, an identification of DMRS configuration type, an identification of a bandwidth part, an identification of a carrier component, a higher layer indicated scrambling identity parameter and an identification of subcarrier spacing.

In an embodiment, the determining unit 610 may be configured to: if a first RS port and a second port are mapped in the same symbol and multiplexed with CDM in frequency domain, determine that the first and second RS ports use the same RS base sequence; and if a first RS port and a second port are mapped in the same resource elements and multiplexed with the CDM in the frequency domain, determine that the first and second RS ports use the same RS base sequence.

In an embodiment, the transmitting unit 620 may be configured to: include the information of the RS patterns in a QCL parameter set; and transmit the QCL parameter set to the terminal device.

In an embodiment, the RS includes at least one of: a DMRS, a CSI-RS, a SRS, a PTRS, and a TRS.

Figure 7:
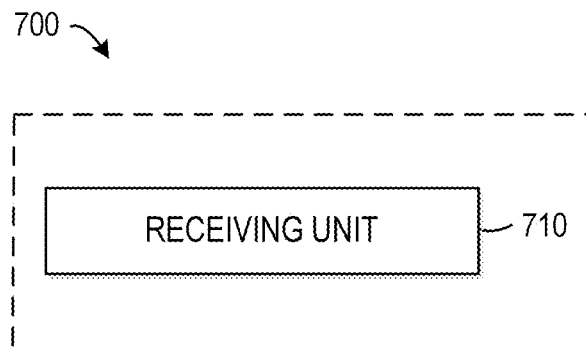
FIG. 7 shows a block diagram of a terminal device 700 in accordance with some embodiments of the present disclosure.

Now reference is made to FIG. 7, which shows a block diagram of an apparatus 700 in accordance with an embodiment of the present disclosure. It would be appreciated that the apparatus 700 may be implemented at a terminal device, for example, the terminal device 120, or any other suitable device.

As shown, the apparatus 700 includes a receiving unit 710 configured to: receive, from a network device, information of one or more RS patterns for a plurality of RS ports. A RS pattern indicates a configuration of a RS to be transmitted to the terminal device via one or more RS ports.

In an embodiment, the receiving unit 710 may be further configured to receive a RS via a RS port. The apparatus 700 may further include a demodulating unit configured to demodulate the RS based on the RS patterns.

In an embodiment, the RS includes at least one of: a DMRS, a CSI-RS, a SRS, a PTRS, and a TRS.

It is also to be noted that the apparatus 600 or 700 may be respectively implemented by any suitable technique either known at present or developed in the future. Further, a single device shown in FIG. 2 or 5 may be alternatively implemented in multiple devices separately, and multiple separated devices may be implemented in a single device. The scope of the present disclosure is not limited in these regards.

It is noted that the apparatus 600 or 700 may be configured to implement functionalities as described with reference to FIG. 2 or 5. Therefore, the features discussed with respect to the method 200 may apply to the corresponding components of the apparatus 600, and the features discussed with respect to the method 500 may apply to the corresponding components of the apparatus 600. It is further noted that the components of the apparatus 600 or 700 may be embodied in hardware, software, firmware, and/or any combination thereof. For example, the components of the apparatus 600 or 700 may be respectively implemented by a circuit, a processor or any other appropriate device. Those skilled in the art will appreciate that the aforesaid examples are only for illustration not limitation.

In some embodiment of the present disclosure, the apparatus 600 or 700 may comprise at least one processor. The at least one processor suitable for use with embodiments of the present disclosure may include, by way of example, both general and special purpose processors already known or developed in the future. The apparatus 600 or 700 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 600 to at least perform according to the method 200 as discussed above and to cause the apparatus 700 to at least perform according to the method 500 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 6 or 7 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

Figure 8:
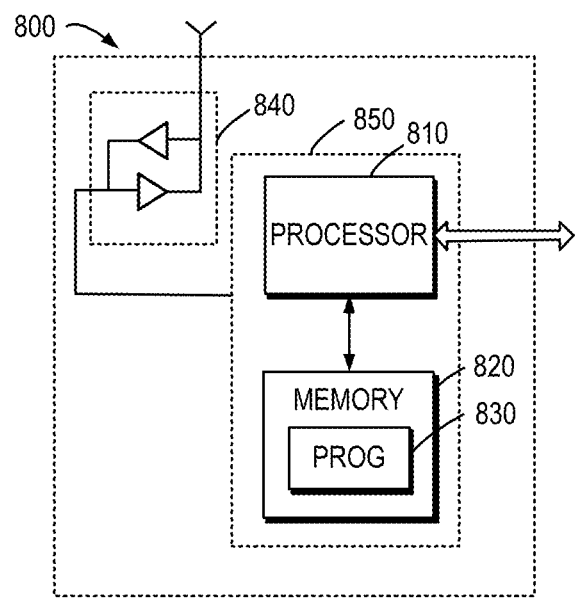
FIG. 8 is a simplified block diagram of a device 800 that is suitable for implementing embodiments of the present disclosure.

FIG. 8 is a simplified block diagram of a device 800 that is suitable for implementing embodiments of the present disclosure. As shown, the device 800 includes one or more processors 810, one or more memories 820 coupled to the processor(s) 810, one or more transmitters and/or receivers (TX/RX) 840 coupled to the processor 810.

The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 820 stores at least a part of a program 830. The TX/RX 840 is for bidirectional communications. The TX/RX 840 has at least one antenna to facilitate communication, though in practice a terminal device or a network device mentioned in this disclosure may have several ones. The communication interface may represent any interface that is necessary for communication with other network elements.

The program 830 is assumed to include program instructions that, when executed by the associated processor 810, enable the device 800 to operate in accordance with the embodiments of the present disclosure, as discussed herein with reference to FIGS. 2 and 5. That is, embodiments of the present disclosure can be implemented by computer software executable by the processor 810 of the device 800, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A network device comprising a processor configured to:
    determine an initial value for generating an DeModulation Reference Signal (DMRS) sequence based on an index of an DMRS port group;
    transmit, to a terminal, information on the initial value; and
    transmit, to the terminal, the DMRS sequence via an DMRS port,
    wherein the DMRS port is included in the DMRS port group, and
    wherein different DMRS sequences for more than one DMRS port group are used for one Physical Downlink Shared Channel (PDSCH) or one Physical Uplink Shared Channel (PUSCH).

2. The network device according to claim 1, wherein DMRS ports included in the DMRS port group are Quasi Co Located (QCLed).

3. The network device according to claim 1,
    wherein the processor configured to:
    determine the initial value based on a slot index, and wherein
        a range of the slot index is an integer from 0 to 9 for a value of subcarrier spacing being 15 kHz,
        the range of the slot index is an integer from 0 to 19 for a value of subcarrier spacing being 30 kHz,
        the range of the slot index is an integer from 0 to 39 for a value of subcarrier spacing being 60 kHz,
        the range of the slot index is an integer from 0 to 79 for a value of subcarrier spacing being 120 kHz, or
        the range of the slot index is an integer from 0 to 159 for a value of subcarrier spacing being 240 kHz.

4. A terminal comprising a processor configured to:
    receive, from a network device, information on an initial value for generating an DeModulation Reference Signal (DMRS) sequence;
    receive, from the network device, the DMRS sequence via an DMRS port; and
    demodulate the DMRS sequence based on the initial value determined based on an index of an DMRS port group,
    wherein the DMRS port is included in the DMRS port group, and
    wherein different DMRS sequences for more than one DMRS port group are used for one Physical Downlink Shared Channel (PDSCH) or one Physical Uplink Shared Channel (PUSCH).

5. The terminal according to claim 4, wherein DMRS ports included in the DMRS port group are Quasi Co Located (QCLed).

6. The terminal according to claim 4, wherein
    the initial value is determined based on a slot index, and wherein
        a range of the slot index is an integer from 0 to 9 for a value of subcarrier spacing being 15 kHz,
        the range of the slot index is an integer from 0 to 19 for a value of subcarrier spacing being 30 kHz,
        the range of the slot index is an integer from 0 to 39 for a value of subcarrier spacing being 60 kHz,
        the range of the slot index is an integer from 0 to 79 for a value of subcarrier spacing being 120 kHz, or
        the range of the slot index is an integer from 0 to 159 for a value of subcarrier spacing being 240 kHz.

7. A method comprising:
    determining an initial value for generating an DeModulation Reference Signal (DMRS) sequence based on an index of an DMRS port group;
    transmitting information on the initial value; and
    transmitting the DMRS sequence via an DMRS port,
    wherein the DMRS port is included in the DMRS port group, and
    wherein different DMRS sequences for more than one DMRS port group are used for one Physical Downlink Shared Channel (PDSCH) or one Physical Uplink Shared Channel (PUSCH).

8. The method according to claim 7, wherein DMRS ports included in the DMRS port group are Quasi Co Located (QCLed).

9. The method according to claim 7, further comprising determining the initial value based on a slot index, and wherein
    a range of the slot index is an integer from 0 to 9 for a value of subcarrier spacing being 15 kHz,
    the range of the slot index is an integer from 0 to 19 for a value of subcarrier spacing being 30 kHz,
    the range of the slot index is an integer from 0 to 39 for a value of subcarrier spacing being 60 kHz,
    the range of the slot index is an integer from 0 to 79 for a value of subcarrier spacing being 120 kHz, or
    the range of the slot index is an integer from 0 to 159 for a value of subcarrier spacing being 240 kHz.

10. A method comprising:
    receiving information on an initial value for generating an DeModulation Reference Signal (DMRS) sequence;
    receiving the DMRS sequence via an DMRS port; and
    demodulating the DMRS sequence based on the initial value determined based on DMRS ports included in the DMRS port group,
    wherein the DMRS port is included in the DMRS port group, and wherein different DMRS sequences for more than one DMRS port group are used for one Physical Downlink Shared Channel (PDSCH) or one Physical Uplink Shared Channel (PUSCH).

11. The method according to claim 10, wherein DMRS ports included in the DMRS port group are Quasi Co Located (QCLed).

12. The method according to claim 10, wherein
the initial value is determined based on the slot index, and wherein
    a range of the slot index is an integer from 0 to 9 for a value of subcarrier spacing being 15 kHz,
    the range of the slot index is an integer from 0 to 19 for a value of subcarrier spacing being 30 kHz,
    the range of the slot index is an integer from 0 to 39 for a value of subcarrier spacing being 60 kHz,
    the range of the slot index is an integer from 0 to 79 for a value of subcarrier spacing being 120 kHz, or
    the range of the slot index is an integer from 0 to 159 for a value of subcarrier spacing being 240 kHz.

* * * * *